United States Patent
Catherwood

(10) Patent No.: US 7,467,178 B2
(45) Date of Patent: Dec. 16, 2008

(54) DUAL MODE ARITHMETIC SATURATION PROCESSING

(75) Inventor: Michael I. Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 457 days.

(21) Appl. No.: 09/870,944

(22) Filed: Jun. 1, 2001

(65) Prior Publication Data

US 2002/0188640 A1 Dec. 12, 2002

(51) Int. Cl.
*G06F 7/38* (2006.01)
(52) U.S. Cl. ...................................... 708/552
(58) Field of Classification Search ................. 708/530, 708/525, 552, 498
See application file for complete search history.

(56) References Cited

U.S. PATENT DOCUMENTS

| | | |
|---|---|---|
| 3,771,146 A | 11/1973 | Cotton et al. |
| 3,781,810 A | 12/1973 | Downing |
| 3,886,524 A | 5/1975 | Appelt |
| 3,930,253 A | 12/1975 | Maida |
| 4,025,771 A | 5/1977 | Lynch et al. |
| 4,074,353 A | 2/1978 | Woods et al. |
| 4,090,250 A | 5/1978 | Carlson et al. |
| 4,323,981 A | 4/1982 | Nakamura |
| 4,379,338 A * | 4/1983 | Nishitani et al. ............ 708/552 |
| 4,398,244 A | 8/1983 | Chu et al. |
| 4,408,274 A | 10/1983 | Wheatley et al. |
| 4,451,885 A | 5/1984 | Gerson et al. |
| 4,472,788 A | 9/1984 | Yamazaki |
| 4,481,576 A | 11/1984 | Bicknell |
| 4,488,252 A | 12/1984 | Vassar |
| 4,511,990 A | 4/1985 | Hagiwara et al. |
| 4,556,938 A | 12/1985 | Parker et al. |
| 4,615,005 A | 9/1986 | Maejima et al. |
| 4,626,988 A | 12/1986 | George |
| 4,709,324 A | 11/1987 | Kloker |
| 4,730,248 A | 3/1988 | Watanabe et al. |
| 4,742,479 A | 5/1988 | Kloker et al. |

(Continued)

FOREIGN PATENT DOCUMENTS

EP 0 554 917 A2 8/1993

(Continued)

OTHER PUBLICATIONS

Moon B I et al.: "A 32-bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84-A No. 5, pp. 1339-1347, XP001060025 ISSN: 0916-8508, May 2001.

(Continued)

*Primary Examiner*—Chat C Do
(74) *Attorney, Agent, or Firm*—Baker Botts L.L.P.

(57) ABSTRACT

A system and method for overflow and saturation processing during accumulator operations that reduces the error in a saturation operation. Upon overflow, additional guard bits used in conjunction with an accumulator allow a user to continue processing without any error in the values used in computations following the overflow. A saturation condition can be detected following the overflow the appropriate maximum value stored in the accumulator upon detecting saturation.

4 Claims, 1 Drawing Sheet

U.S. PATENT DOCUMENTS

| | | |
|---|---|---|
| 4,768,149 A | 8/1988 | Konopik et al. |
| 4,779,191 A | 10/1988 | Greenblatt |
| 4,782,457 A | 11/1988 | Cline |
| 4,800,524 A | 1/1989 | Roesgen |
| 4,807,172 A | 2/1989 | Nukiyama |
| 4,829,420 A | 5/1989 | Stahle |
| 4,829,460 A | 5/1989 | Ito |
| 4,839,846 A | 6/1989 | Hirose et al. |
| 4,841,468 A | 6/1989 | Miller et al. |
| 4,872,128 A | 10/1989 | Shimizu |
| 4,882,701 A | 11/1989 | Ishii |
| 4,926,371 A | 5/1990 | Vassilliadis et al. |
| 4,941,120 A | 7/1990 | Brown et al. |
| 4,943,940 A | 7/1990 | New |
| 4,945,507 A * | 7/1990 | Ishida et al. ............... 708/530 |
| 4,959,776 A | 9/1990 | Deerfield et al. |
| 4,977,533 A | 12/1990 | Miyabayashi et al. |
| 4,984,213 A | 1/1991 | Abdoo et al. |
| 5,007,020 A | 4/1991 | Inskeep |
| 5,012,441 A | 4/1991 | Retter |
| 5,032,986 A | 7/1991 | Pathak et al. |
| 5,034,887 A | 7/1991 | Yasui et al. |
| 5,038,310 A | 8/1991 | Akagiri et al. |
| 5,040,178 A | 8/1991 | Lindsay et al. |
| 5,056,004 A | 10/1991 | Ohde et al. |
| 5,099,445 A | 3/1992 | Studor et al. |
| 5,101,484 A | 3/1992 | Kohn |
| 5,117,498 A | 5/1992 | Miller et al. |
| 5,121,431 A | 6/1992 | Wiener |
| 5,122,981 A | 6/1992 | Taniguchi |
| 5,155,823 A | 10/1992 | Tsue |
| 5,177,373 A | 1/1993 | Nakamura |
| 5,197,023 A | 3/1993 | Nakayama |
| 5,197,140 A | 3/1993 | Balmer |
| 5,206,940 A | 4/1993 | Murakami et al. |
| 5,212,622 A | 5/1993 | Cocanougher et al. |
| 5,212,662 A | 5/1993 | Cocanougher et al. |
| 5,218,239 A | 6/1993 | Boomer |
| 5,239,654 A | 8/1993 | Ing-Simmons et al. |
| 5,276,634 A | 1/1994 | Suzuki et al. |
| 5,282,153 A | 1/1994 | Bartkowiak et al. |
| 5,327,543 A | 7/1994 | Miura et al. |
| 5,327,566 A | 7/1994 | Forsyth |
| 5,375,080 A | 12/1994 | Davies |
| 5,379,240 A | 1/1995 | Byrne |
| 5,386,563 A | 1/1995 | Thomas |
| 5,392,435 A | 2/1995 | Masui et al. |
| 5,418,976 A | 5/1995 | Iida |
| 5,422,805 A | 6/1995 | McIntyre et al. |
| 5,432,943 A | 7/1995 | Mitsuishi |
| 5,448,703 A | 9/1995 | Amini et al. |
| 5,448,706 A | 9/1995 | Fleming et al. |
| 5,450,027 A | 9/1995 | Gabara |
| 5,463,749 A | 10/1995 | Wertheizer et al. |
| 5,469,377 A | 11/1995 | Amano |
| 5,471,600 A | 11/1995 | Nakamoto |
| 5,497,340 A | 3/1996 | Uramoto et al. |
| 5,499,380 A | 3/1996 | Iwata et al. |
| 5,504,916 A | 4/1996 | Murakami et al. |
| 5,506,484 A | 4/1996 | Munro et al. |
| 5,517,436 A * | 5/1996 | Andreas et al. ............. 708/524 |
| 5,525,874 A | 6/1996 | Mallarapu et al. |
| 5,548,544 A | 8/1996 | Matheny et al. |
| 5,561,384 A | 10/1996 | Reents et al. |
| 5,561,619 A | 10/1996 | Watanabe et al. |
| 5,564,028 A | 10/1996 | Swoboda et al. |
| 5,568,380 A | 10/1996 | Broadnax et al. |
| 5,568,412 A | 10/1996 | Han et al. |
| 5,596,760 A | 1/1997 | Ueda |
| 5,600,813 A | 2/1997 | Nakagawa et al. |
| 5,611,061 A | 3/1997 | Yasuda |
| 5,619,711 A | 4/1997 | Anderson |
| 5,623,646 A | 4/1997 | Clarke |
| 5,638,524 A | 6/1997 | Kiuchi et al. |
| 5,642,516 A | 6/1997 | Hedayat et al. |
| 5,649,146 A | 7/1997 | Riou |
| 5,651,121 A | 7/1997 | Davies |
| 5,657,484 A | 8/1997 | Scarrá |
| 5,659,700 A | 8/1997 | Chen et al. |
| 5,682,339 A | 10/1997 | Tam |
| 5,689,693 A | 11/1997 | White |
| 5,694,350 A | 12/1997 | Wolrich et al. |
| 5,696,711 A | 12/1997 | Makineni |
| 5,701,493 A | 12/1997 | Jaggar |
| 5,706,460 A | 1/1998 | Craig et al. |
| 5,706,466 A | 1/1998 | Dockser |
| 5,715,470 A | 2/1998 | Asano et al. |
| 5,737,570 A | 4/1998 | Koch |
| 5,740,095 A | 4/1998 | Parant |
| 5,740,419 A | 4/1998 | Potter |
| 5,740,451 A | 4/1998 | Muraki et al. |
| 5,748,516 A | 5/1998 | Goddard et al. |
| 5,748,970 A | 5/1998 | Miyaji et al. |
| 5,764,555 A | 6/1998 | McPherson et al. |
| 5,765,216 A | 6/1998 | Weng et al. |
| 5,765,218 A | 6/1998 | Ozawa et al. |
| 5,774,711 A | 6/1998 | Henry et al. |
| 5,778,237 A | 7/1998 | Yamamoto et al. |
| 5,778,416 A | 7/1998 | Harrison et al. |
| 5,790,443 A | 8/1998 | Shen et al. |
| 5,808,926 A | 9/1998 | Gorshtein et al. |
| 5,812,439 A | 9/1998 | Hansen |
| 5,812,868 A | 9/1998 | Moyer et al. |
| 5,815,693 A | 9/1998 | McDermott et al. |
| 5,825,730 A | 10/1998 | Nishida et al. |
| 5,826,072 A | 10/1998 | Knapp et al. |
| 5,826,096 A | 10/1998 | Baxter |
| 5,828,875 A | 10/1998 | Halvarsson et al. |
| 5,862,065 A | 1/1999 | Muthusamy |
| 5,867,726 A | 2/1999 | Ohsuga et al. |
| 5,875,342 A | 2/1999 | Temple |
| 5,880,984 A | 3/1999 | Burchfiel et al. |
| 5,892,697 A | 4/1999 | Brakefield |
| 5,892,699 A | 4/1999 | Duncan et al. |
| 5,894,428 A | 4/1999 | Harada |
| 5,900,683 A | 5/1999 | Rinehart et al. |
| 5,909,385 A | 6/1999 | Nishiyama et al. |
| 5,917,741 A | 6/1999 | Ng |
| 5,918,252 A | 6/1999 | Chen et al. |
| 5,930,159 A | 7/1999 | Wong |
| 5,930,503 A | 7/1999 | Drees |
| 5,936,870 A * | 8/1999 | Im ............................. 708/552 |
| 5,937,199 A | 8/1999 | Temple |
| 5,938,759 A | 8/1999 | Kamijo |
| 5,941,940 A | 8/1999 | Prasad et al. |
| 5,943,249 A | 8/1999 | Handlogten |
| 5,944,816 A | 8/1999 | Dutton et al. |
| 5,951,627 A | 9/1999 | Kiamilev et al. |
| 5,951,679 A | 9/1999 | Anderson et al. |
| 5,973,527 A | 10/1999 | Schweighofer et al. |
| 5,974,549 A | 10/1999 | Golan |
| 5,978,825 A | 11/1999 | Divine et al. |
| 5,983,333 A | 11/1999 | Kolagotia et al. |
| 5,991,787 A | 11/1999 | Abel et al. |
| 5,991,868 A | 11/1999 | Kamiyama et al. |
| 5,996,067 A | 11/1999 | White |
| 6,002,234 A | 12/1999 | Ohm et al. |
| 6,009,454 A | 12/1999 | Dummermuth |
| 6,014,723 A | 1/2000 | Tremblay et al. |
| 6,018,757 A | 1/2000 | Wong |
| 6,026,489 A | 2/2000 | Wachi et al. |
| 6,044,392 A | 3/2000 | Anderson et al. |
| 6,044,434 A | 3/2000 | Oliver |
| 6,049,858 A | 4/2000 | Kolagotia et al. |

| | | | | | | |
|---|---|---|---|---|---|---|
| 6,055,619 | A | 4/2000 | North et al. | 6,763,478 | B1 | 7/2004 Bui |
| 6,058,409 | A | 5/2000 | Kozaki et al. | 6,819,971 | B1 * | 11/2004 Alidina et al. .............. 708/525 |
| 6,058,410 | A | 5/2000 | Sharangpani | 2002/0194466 | A1 | 12/2002 Catherwood et al. |
| 6,058,464 | A | 5/2000 | Taylor | 2003/0055860 | A1 * | 3/2003 Giacalone et al. |
| 6,061,711 | A | 5/2000 | Song et al. | 2003/0093656 | A1 | 5/2003 Masse et al. |
| 6,061,780 | A | 5/2000 | Shippey et al. | 2004/0150439 | A1 | 8/2004 Greenfeld |
| 6,061,783 | A | 5/2000 | Harriman | | | |
| 6,076,154 | A | 6/2000 | Van Eijndhoven et al. | | | |
| 6,084,880 | A | 7/2000 | Bailey et al. | | | |
| 6,101,521 | A | 8/2000 | Kosiec | | | |
| 6,101,599 | A | 8/2000 | Wright et al. | | | |
| 6,115,732 | A | 9/2000 | Oberman et al. | | | |
| 6,128,728 | A | 10/2000 | Dowling | | | |
| 6,134,574 | A | 10/2000 | Oberman et al. | | | |
| 6,144,980 | A | 11/2000 | Oberman | | | |
| 6,145,049 | A | 11/2000 | Wong | | | |
| 6,181,151 | B1 | 1/2001 | Wasson | | | |
| 6,202,163 | B1 | 3/2001 | Gabzdyl et al. | | | |
| 6,205,467 | B1 | 3/2001 | Lambrecht et al. | | | |
| 6,209,086 | B1 | 3/2001 | Chi et al. | | | |
| 6,243,786 | B1 | 6/2001 | Huang et al. | | | |
| 6,243,804 | B1 | 6/2001 | Cheng | | | |
| 6,260,162 | B1 | 7/2001 | Typaldos et al. | | | |
| 6,282,637 | B1 | 8/2001 | Chan et al. | | | |
| 6,292,866 | B1 | 9/2001 | Zaiki et al. | | | |
| 6,295,574 | B1 | 9/2001 | MacDonald | | | |
| 6,300,800 | B1 | 10/2001 | Schmitt et al. | | | |
| 6,315,200 | B1 | 11/2001 | Silverbrook et al. | | | |
| 6,356,970 | B1 | 3/2002 | Killian et al. | | | |
| 6,377,619 | B1 * | 4/2002 | Denk et al. ................. 708/322 | | | |
| 6,397,318 | B1 | 5/2002 | Peh | | | |
| 6,412,081 | B1 | 6/2002 | Koscal et al. | | | |
| 6,434,020 | B1 | 8/2002 | Lambert et al. | | | |
| 6,487,654 | B2 | 11/2002 | Dowling | | | |
| 6,523,108 | B1 | 2/2003 | James et al. | | | |
| 6,552,625 | B2 | 4/2003 | Bowling | | | |
| 6,564,238 | B1 * | 5/2003 | Kim et al. ................... 708/513 | | | |
| 6,633,970 | B1 | 10/2003 | Clift et al. | | | |
| 6,643,150 | B2 | 11/2003 | Kawakami | | | |
| 6,658,578 | B1 | 12/2003 | Laurenti et al. | | | |
| 6,681,280 | B1 | 1/2004 | Miyake et al. | | | |
| 6,694,398 | B1 | 2/2004 | Zhao et al. | | | |
| 6,724,169 | B2 | 4/2004 | Majumdar et al. | | | |
| 6,728,856 | B2 | 4/2004 | Grosbach et al. | | | |
| 6,751,742 | B1 | 6/2004 | Duhault et al. | | | |

FOREIGN PATENT DOCUMENTS

| | | |
|---|---|---|
| EP | 0 855 643 A1 | 7/1998 |
| EP | 0 992 888 | 12/2000 |
| EP | 0 992 889 | 12/2000 |
| JP | 01037124 A | 2/1989 |
| WO | 96/11443 | 4/1996 |

OTHER PUBLICATIONS

Turley J: "Balancing Conflicting Requirements When Mixing RISC, DSPs" Computer Design, Pennwell Publ. Littleton, Massachusetts, IS, vol. 37, No. 10, pp. 46, 48, 50-53, XP000860706 ISSN:0010-4566, Oct. 1998.

Levy M: "Microprocessor and DSP Technologies Unite for Embedded Applications" EDN Electrical Design News, Cahners Publishing Co., Newtown Massachusetts, US, No. Europe, pp. 73-74, 76, 78-80, XP000779113 ISSN: 0012-7515, Mar. 2, 1998.

Intel, Pentium Processor Family Developer's Manual, vol. 3: Architecture and Programming Manual, , pp. 3-1, 3-2, 3-15, 14-1, to 14-30, 18-7, and 25-289 to 25-292, 1995.

Intel, Embedded Intel486 Processor Family Developer's Manual, pp. 2-2, 3-17, 3-37, 4-5, 4-6, 10-1 to 10-12, 12-1 to 12-10, Oct. 1997.

Moore, M "Z80 Family Interrupt Structure". Barleywood (online), retrieved from the internet <URL: http://www.gaby.de/z80/1653.htm>, 1997.

PCT Search Report based on PCT/US02/16706, 6 pages, Mailed Sep. 27, 2002.

PCT Search Report based on PCT/US02/16705, 7 pages, Mailed Sep. 9, 2002.

PCT Search Report based on PCT/US02/16921, 4 pages, Mailed Oct. 18, 2002.

SPARC, International, Inc., "The SPARC Architecture Manual", Version 8, pp. 1-303, 1992.

SPARC, International, Inc., "The SPARC Architecture Manual", Version 9, pp. 137-299, 1994-2000.

Free On-Line Dictionary of Computing (FOLDOC), http://wombat.doc.ic.ac.uk/foldoc/foldoc.cgi?query=program+counter, 1995.

* cited by examiner

DUAL MODE ARITHMETIC SATURATION PROCESSING

FIELD OF THE INVENTION

The present invention relates to systems and methods in a device such as a processor, including microprocessors and controllers. More particularly, the present invention relates to systems and methods for overflow and saturation processing during accumulator operations.

BACKGROUND OF THE INVENTION

Processors, including microprocessors, digital signal processors and microcontrollers, typically include an accumulator that stores the results of operations performed by the processor. Common operations performed include addition and subtraction. Addition and subtraction operations may cause the result of the operation to exceed the maximum value of the accumulator.

In an accumulator, the most significant bit of the accumulator can be used to represent the sign of the number stored in the remaining bits of the accumulator. For example, in a 32 bit accumulator the most significant bit, b31 can represent the sign of the number stored in bits $b_{30}$-$b_0$. Using such an arrangement, the accumulator can store a maximum negative number of 0x80000000, where "0x" denotes hexadecimal. The accumulator can store a maximum positive number of 0x7FFFFFFF. Typical saturation processing in the exemplary 32 bit accumulator sets the 32 bit accumulator to the maximum positive number, 0x7FFFFFFF, or the maximum negative number 0x80000000 as the case may require. To illustrate, suppose the following two numbers are added, 0x007FFFF000 and 0x0000001020. The result is 0x0080000020, with an overflow of the result into the sign bit, $b_{31}$. Because the result of adding two positive numbers overflowed, the maximum positive number 0x007FFFFFFF is stored in the accumulator.

The above common saturation operation, however, causes the result to be truncated. That is, the actual result of the operation is lost and an approximate result represented by a selected one of the predetermined constants is stored in the accumulator. Thus, the accumulator value after being set by the saturation processing is erroneous. It is desirable to minimize the error introduced by the saturation processing.

SUMMARY OF THE INVENTION

It is an object of the present invention to provide an efficient saturation processing system and method.

It is another object of the present invention to provide a saturation processing system and method that reduces the error introduced by the saturation processing.

It is a further object of the present invention to provide a saturation processing system and method that allows programmers the flexibility of additional accuracy in overflow and saturation processing.

It is still another object of the present invention to provide a saturation processing system and method that provides enhanced computational accuracy in saturation processing of an overflow condition.

It is still a further object of the present invention to provide a saturation processing system and method that can be selectively enabled and disabled.

To achieve the above an other objects, the present invention provides a system for overflow and saturation processing, comprising: an adder, operatively connected to receive first and second operands, and connected to add the operands; an accumulator, operatively connected to store at least a portion of the added operands or at least a portion of a selected one of predetermined constants based on control signals; guard bits, operatively connected to store the remaining portion of the added operands or the remaining portion of the selected one of predetermined constants based on the control signals; overflow logic operatively connected to the accumulator and to the guard bits so as to indicate overflow of the accumulator; and saturation logic, operatively connected to the adder, to the guard bits, and connected to provide the control signals based on at least a portion of the added operands at least a portion of the guard bits.

To achieve the above and other object, the present invention also provides a method for overflow and saturation processing in a processor including guard bits and an accumulator, comprising: adding operands to form a result; comparing a portion of the result with a portion of the guard bits; storing either a portion of the result in the accumulator and the remaining portion of the result in the guard bits, or a portion of a selected predetermined constant in the accumulator and the remaining portion of the predetermined constant in the guard bits in accordance with an enable signal and the result of the comparison.

DETAILED DESCRIPTION OF THE PREFERRED EMBODIMENTS

Figure 1:
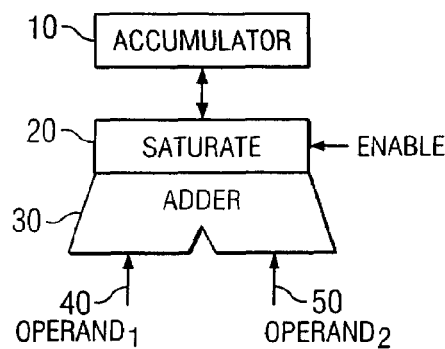
FIG. 1 is a schematic block diagram of a portion of a processor structure that can embody the present invention.

FIG. 1 is a schematic block diagram of a portion of a processor structure that can embody the present invention. Referring to FIG. 1, saturation logic 20 is coupled to an accumulator 10 and to an adder 30. As will be recognized by those skilled in the art, the adder 30 performs operations on Operand$_1$ and Operand$_2$. In the above example, of adding 0x007FFFF000 and 0x0000001020. The result is 0x0080000020. By comparing the most sign bit, $b_{31}$, of the result with the sign of the accumulator, the overflow condition is detected. The saturation logic 20 causes the maximum positive number 0x007FFFFFFF to be stored in the accumulator 10.

Figure 2:
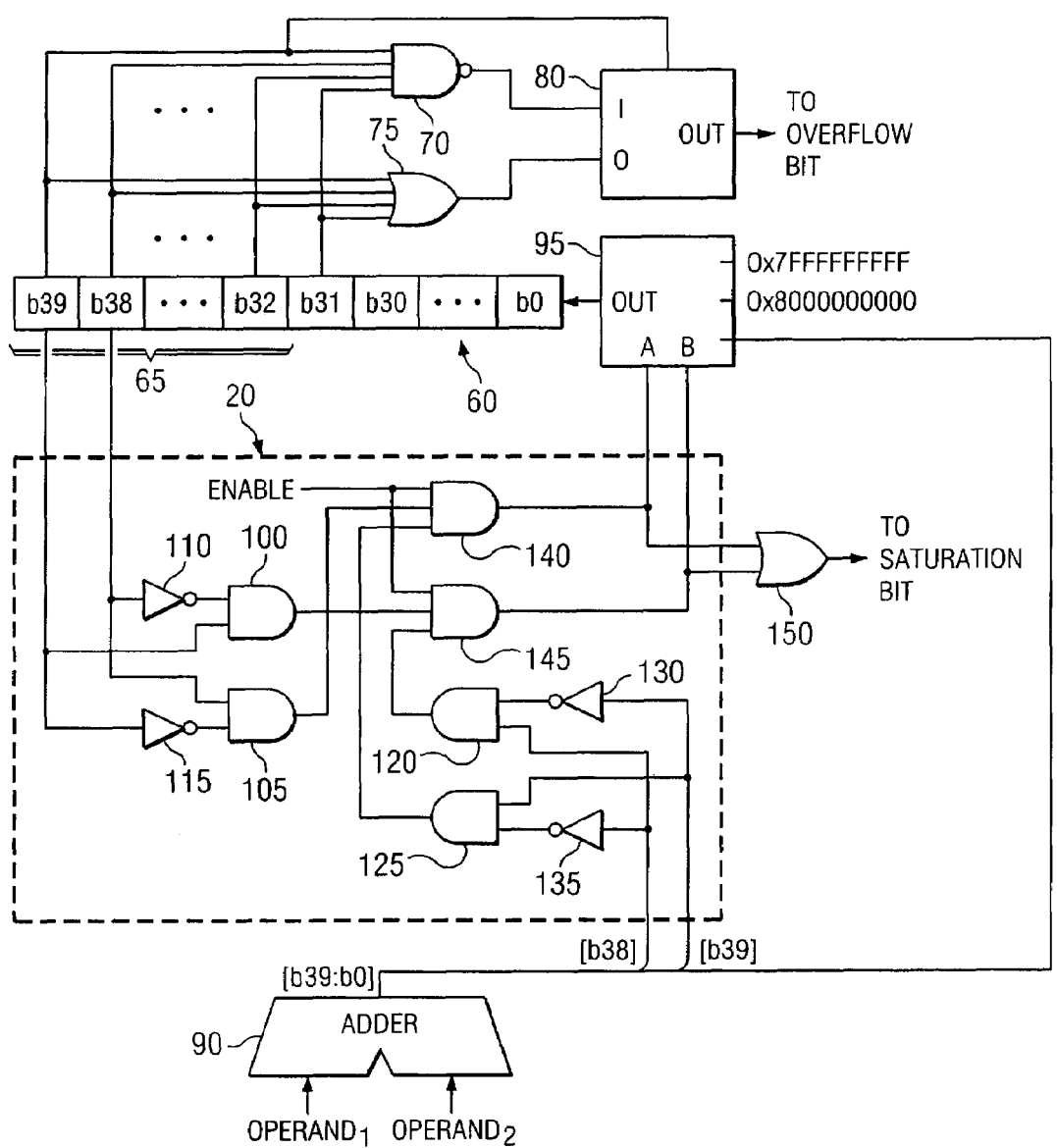
FIG. 2 is a schematic block diagram of an exemplary embodiment of the present invention.

FIG. 2 is a schematic block diagram of an exemplary embodiment of the present invention. This is only an example of an embodiment of the present invention. Those skilled in the art will recognize that the logic of FIG. 2 can be implemented in a variety of ways, such as, for example, micro code, logic gates, or a programmable logic array. Moreover, while FIG. 2 shows a 32-bit accumulator, the invention is not limited to any particular number of bits in an accumulator.

FIG. 2 shows an exemplary 32-bit accumulator 60. Bit $b_{31}$ of accumulator 60 represents the sign of the value stored in bits $b_0$-$b_{31}$. In accordance with the present invention, guard bits 65 are used in conjunction with the accumulator 60. In FIG. 2, bits $b_{39}$-$b_{32}$ represent the guard bits 65. The present invention is not limited to eight guard bits as shown in FIG. 2. Preferably two or more guard bits are used, with the upper limit of guard bits being determined by the particular application.

NAND gate 70 and OR gate 75 detect an overflow condition of the accumulator. The output of a multiplexer 80 indicates whether the operation performed by adder 90. The output of multiplexer 80 can be applied to a status register, not shown. The state of the overflow bit in the status register can change for each operation performed by adder 90.

FIG. 2 shows saturation logic 20 coupled to the guard bits 65, the accumulator 60 and adder 90. The saturation logic 20 provides control signals to selector inputs "A" and "B" of a multiplexer 95. As shown in the illustrative example of FIG. 2, the saturation logic 20 compares most significant bits of the guard bits 65 with most significant bits of the result of the operation performed by the adder 90. In FIG. 2, AND gates 100 and 105 together with inverters 110 and 115 combine guard bits $b_{39}$ and $b_{38}$. In addition, AND gates 120 and 125 together with inverters 130 and 135 combine bits $b_{39}$ and $b_{38}$ of the result of the operation performed by adder 90. AND gates 140 and 145 compare the outputs of And gates 100, 105, 120, and 125 to form control signals that are applied to the A, B inputs of multiplexer 95. AND gates 140 and 145 also receive an Enable signal. In an example embodiment of the present invention, the Enable signal could originate in a mode register that has bits that are set and reset by respective instructions executed by the processor. In the illustrative example shown in FIG. 2, when the Enable signal is active, logic 1, the saturation logic allows one of two predetermined constants to be stored in the guard bits 65 and accumulator 60 as indicated by Table 2 shown below. Alternatively, if the Enable signal is inactive, logic 0, the multiplexer/selector 90 allows the result of the operation performed by the adder 90 to be stored in the guard bits 65 and accumulator 60. The Enable signal and the AND gates 140 and 145 function as a means for providing the control signals in accordance with the Enable signal and in accordance with the comparison of the guard bits 65 and the result of the operation performed by the adder 90.

In addition, together gates 100-145 function as a logic means that is responsive to the comparison of the guard bits 65 and the result of the operation performed by the adder 90 so as to selectively provide the control signals so that the accumulator stores at least a portion of the added operands and the guard bits store the remaining portion of the added operands, or the accumulator stores at least a portion of a predetermined constant (e.g., 0x7FFFFFFFFF) and the guard bits store the remaining portion of the predetermined constant (e.g., 0x7FFFFFFFFF). Table 1 illustrates the logic conditions that give rise to a saturation condition in the illustrative embodiment shown in FIG. 2. In Table 1, the "x" denotes a "don't care" condition of the respective bit.

TABLE 1

| Guard Bit $b_{39}$ | Guard Bit $b_{38}$ | Result Bit $b_{39}$ | Result Bit $b_{38}$ | Action |
|---|---|---|---|---|
| 0 | 1 | 1 | 0 | Saturation, Store 0x7FFFFFFFFF in Guard bits and Accumulator |
| 1 | 0 | 0 | 1 | Saturation, Store 0x800000000 in Guard bits and Accumulator |
| 0 | x | 0 | x | No action, store result of operation performed by Adder |
| 1 | x | 1 | x | No action, store result of operation performed by Adder | output of an OR gate 150 indicates if saturation condition has occurred. Typically, the output of the OR gate 150 is applied to a saturation bit in a status register (not shown). It is common that the saturation bit of the status register be set on the occurrence of saturation and remain set until reset by an instruction executed by the processor. Table 2 below represents logical operation of the multiplexer 95.

The output of the multiplexer 95 is stored in the guard bits 65 and the accumulator 60.

TABLE 2

| A | B | OUT |
|---|---|---|
| 0 | 0 | Result [$b_{39}$-$b_0$] |
| 0 | 1 | 0x800000000 |
| 1 | 0 | 0x7FFFFFFFFF |
| (1 | 1 | Not possible) |

While specific embodiments of the present invention have been illustrated and described, it will be understood by those skilled in the art that changes may be made to those embodiments without departing from the spirit and scope of the invention that is defined by the following claims.

What is claimed is:

1. A system for overflow and saturation processing, comprising:
    an adder, operatively connected to receive first and second operands, and connected to add the operands to produce a result of the added operands;
    an accumulator, operatively connected to store at least a portion of the result of the added operands or at least a portion of a selected one of predetermined constants based on control signals;
    guard bits, operatively connected to store the remaining portion of the result of the added operands or the remaining portion of the selected one of predetermined constants based on the control signals;
    overflow logic operatively connected to the accumulator and to the guard bits so as to indicate overflow of the accumulator;
    saturation logic, operatively connected to the adder, to the guard bits, and connected to provide the control signals based on at least a portion of the result of the added operands and at least a portion of the guard bits; and
    wherein the saturation logic comprises a plurality of AND logic gates and a plurality of inverting logic gates, the pluralities of AND gates and the plurality of inverting logic gates configured to compare most significant bits of the guard bits and most significant bits of the result of the added operands, and further configured to generate the control signals in accordance with the comparison.

2. The system according to claim 1, wherein the saturation logic includes:
    a selector operatively connected to selectively provide a one of the result of the added operands or a one of the predetermined constants based on the comparison.

3. The system according to claim 1, wherein the logic means includes:
    means for providing the control signals in accordance with an enable signal and in accordance with the comparison.

4. The system according to claim 3, wherein the logic means further includes:
    means, responsive to the comparison, for selectively providing the control signals so that the accumulator stores at least a portion of the result of the added operands and the guard bits store the remaining portion of the result of the added operands, or the accumulator stores at least a portion of a predetermined constant and the guard bits store the remaining portion of the predetermined constant.

* * * * *